United States Patent [19]
Snedeker et al.

[11] Patent Number: 5,460,647
[45] Date of Patent: Oct. 24, 1995

[54] COLOR-CHANGING MARKING COMPOSITION SYSTEM

[75] Inventors: Colin M. Snedeker; David C. Fistner, both of Bethlehem, Pa.

[73] Assignee: Binney & Smith Inc., Easton, Pa.

[21] Appl. No.: 386,964

[22] Filed: Feb. 10, 1995

[51] Int. Cl.$^6$ ............................................. C09D 11/12
[52] U.S. Cl. ................... 106/22 A; 106/22 B; 106/21 R; 106/21 A; 106/19 B
[58] Field of Search ........................... 106/22 A, 22 B, 106/21 R, 21 A, 19 B

[56] References Cited

U.S. PATENT DOCUMENTS

| | | | |
|---|---|---|---|
| 2,086,745 | 7/1937 | Sell | 106/22 B |
| 2,305,098 | 12/1942 | Minnear | 106/23 B |
| 2,555,474 | 6/1951 | deVries | 106/22 H |
| 2,559,608 | 7/1951 | Ehrlich | 106/22 A |
| 2,589,306 | 3/1952 | Steiner | 106/22 A |
| 3,400,003 | 9/1968 | Guertin | 106/22 R |
| 3,617,325 | 11/1971 | Spokes et al. | 427/145 |
| 3,627,546 | 12/1971 | Coppeta | 106/21 A |
| 3,672,842 | 6/1972 | Florin | 106/21 A |
| 3,700,603 | 10/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,957,495 | 5/1976 | Teranishi et al. | 106/21 A |
| 3,966,400 | 6/1976 | Birke et al. | 8/14 |
| 3,979,550 | 9/1976 | Panken | 106/22 R |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 A |
| 4,070,194 | 1/1978 | Arakawa | 106/21 E |
| 4,071,645 | 1/1978 | Kahn | 106/6 |
| 4,098,738 | 7/1978 | Buerkley et al. | 428/511 |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,262,935 | 4/1981 | Andersen et al. | 428/488 |
| 4,322,466 | 3/1982 | Tomlinson | 106/21 R |
| 4,352,691 | 10/1982 | Owatari et al. | 106/22 R |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,214 | 6/1985 | Panken | 106/21 R |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,617,058 | 10/1986 | Lee | 106/19 B |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,741,774 | 5/1988 | Lazar | 106/19 B |
| 4,744,826 | 5/1988 | Iijima | 106/20 A |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,024,699 | 6/1991 | Llyama et al. | 106/21 A |
| 5,043,013 | 8/1991 | Kluger et al. | 106/20 R |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 2241653 | 3/1975 | France . |
| 2487372 | 3/1981 | France . |
| 551775 | 6/1932 | Germany . |
| 2834459 | 8/1978 | Germany . |
| 2724820 | 3/1979 | Germany . |
| 2927006 | 7/1979 | Germany . |
| 2927005 | 1/1981 | Germany . |
| 3207217 | 2/1982 | Germany . |
| 59-86672 | 5/1984 | Japan . |
| 59-179572 | 10/1984 | Japan . |
| 62-28834 | 6/1987 | Japan . |
| 1-103676 | 4/1989 | Japan . |
| 3-243673 | 10/1991 | Japan . |
| 1455678 | 1/1975 | United Kingdom . |
| 94/06872 | 3/1994 | WIPO . |

OTHER PUBLICATIONS

Photocopy of the Packaging Material for Crayola Overwriters, Binney & Smith, Inc., Easton, Pa. (1993) and Photocopy of the Packaging Material for Crayola Changeables, Binney & Smith, Inc., Easton, Pa. (1993).
"Color Fibre Pen Inks", BASF Brochure, (1979).

Primary Examiner—Helene Klemanski
Attorney, Agent, or Firm—Leydig, Voit & Mayer, Ltd.

[57] ABSTRACT

A color-changing marking composition system, suitable for use in the form of crayons and pencils, comprising a first marking composition comprising wax, a Leuco dye capable of changing color upon contact with a color change-inducing compound, and a solvent capable of solubilizing the dye; and a second marking composition comprising wax and a color change-inducing compound, which is capable of inducing a color change in a Leuco dye with which it is brought in contact.

20 Claims, No Drawings

U.S. PATENT DOCUMENTS

| | | | |
|---|---|---|---|
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,237 | 3/1993 | May | 427/288 |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 102/22 B |
| 5,262,535 | 11/1993 | Kaiser | 106/22 B |
| 5,279,859 | 1/1994 | May | 427/288 |
| 5,302,194 | 4/1994 | Tanabe et al. | 106/21 A |
| 5,324,348 | 6/1994 | Perret, Jr. | 106/19 B |
| 5,326,388 | 7/1994 | Miller et al. | 106/22 B |
| 5,352,282 | 10/1994 | Miller | 106/22 B |

COLOR-CHANGING MARKING COMPOSITION SYSTEM

TECHNICAL FIELD OF THE INVENTION

This invention relates to marking compositions and marking instruments that contain such compositions, such as crayons and pencils.

BACKGROUND OF THE INVENTION

Marking instruments in the form of crayons have been used by young and old for decades. Historically, crayons have been manufactured by mixing together a binder, typically, a molten wax, and a suitable pigment. The molten mixture would be extruded into a desired shape, such as a cylinder, and subsequently cooled to a solid. The resulting crayon, when rubbed on a surface, such as paper, would leave a mark, i.e., a residue of pigmented wax, on the surface.

Over the years, the crayon has undergone a number of changes to improve its appearance, mechanical and marking properties, and toxicity. One of these changes, which affects the appearance of the crayon and the mark that it leaves on a given surface, is color. A wide variety of vivid and attractive colors has been enabled over the years through the development of new pigments. The increase in the number of colors and hues available in the form of a crayon has fueled the demand for further improvements in crayon properties, generally.

One aspect of crayon technology that has undergone significant change over the years is the composition of the binder component. The natural waxes, which were historically used as binders, have been improved through blending and the inclusion of additives. In addition, synthetic materials have been developed to provide, among other advantages, a more uniform distribution of pigment throughout the crayon, which translates into a more uniform distribution of pigment throughout the crayon mark and the ability to effect a mark on a wider range of surfaces.

Another aspect of crayon technology that has undergone significant change over the years is that of "special effects." For example, one special effect that has been attained is phosphorescence. Phosphorescence has been achieved through the introduction of phosphors, substances that emit light when excited by radiation, into the marking composition. Another special effect that has been attained is fluorescence. Fluorescence is attained by the introduction of fluorescers, substances that emit electromagnetic radiation, usually as visible light, resulting from and occurring only during the absorption of radiation from some other source. Other special effects include the introduction of glitter.

Thermochromic dyes, i.e., dyes whose color is sensitive to temperature, and pH- and bleach-sensitive dyes, i.e., dyes whose color is sensitive to pH or bleach, respectively, have been employed in other types of marking compositions to achieve the special effect of color change. For example, U.S. Pat. No. 5,232,494 discloses an aqueous coloring composition system for use in markers, wherein one composition contains a dye whose coloring ability is destroyed in the presence of a bleach, which is contained in a second composition for application on top of a mark generated with the first composition. Such an aqueous composition, however, is not suitable for use as a marking composition which is intended to be incorporated into a solid crayon. U.S. Pat. No. 3,957,495 discloses a solid writing material containing a colorless, electron donative, chromogenic compound, which develops color upon contact with a writing surface previously coated with an electron accepting substance. Accordingly, this system requires a specially coated writing surface, such as paper or polyvinyl chloride film, in order to achieve a colored mark on the writing surface with the solid writing material.

Special effects aside, the formulation of any marking composition intended for use in the form of a crayon should be such that it produces a crayon with good appearance, mechanical and marking properties, and relatively low toxicity. More particularly, a crayon should advantageously possess sufficient mechanical strength so that it can successfully withstand rubbing on a surface without undue crumbling or breaking. Moreover, the crayon, when rubbed on a surface, should advantageously provide a relatively uniform laydown, i.e., a relatively smooth and uniform layer of the crayon composition on the surface—without undue flaking. Further, the crayon should provide a mark that is substantially clean, and uniform, in coloration. In addition, the crayon should not be unduly hygroscopic in nature, i.e., it should not absorb water to the extent that it acquires a wet feel and loses mechanical strength.

Obtaining an overall satisfactory marking composition with respect to all of these properties, however, is not an easy task. Rather, new crayon formulations, particularly those into which have been introduced special effects, have been found to be fraught with problems, mainly due to the combining together of components never before combined together in a crayon composition.

It is, therefore, an object of the present invention to provide a marking composition system, which is suitable for use in the form of crayons and pencils and which provides a special effect.

Another object of the present invention is to provide a special effect marking composition system capable of generating a high quality mark on a variety of surfaces.

Yet another object of the present invention is to provide a special effect marking composition system with good mechanical strength.

Still another object of the present invention is to provide a special effect marking composition system with good appearance.

A further object of the present invention is to provide a special effect marking composition system with relatively low hygroscopicity.

An even further object of the present invention is to provide a special effect marking composition system with relatively low toxicity.

These and other objects and advantages of the present invention, as well as additional inventive features, will be apparent from the description of the invention provided herein.

BRIEF SUMMARY OF THE INVENTION

The present invention provides a marking composition system suitable for use in the form of crayons and pencils and characterized by the special effect of color change, the capacity to generate a high quality mark on a variety of surfaces, good mechanical strength, good appearance, and relatively low hygroscopicity and toxicity. The color-changing marking composition system comprises (a) a first marking composition comprising wax, a Leuco dye which is capable of changing color upon contact with an acid, and a solvent capable of solubilizing the dye, and (b) a second marking composition comprising wax and an acid which induces a color change in the dye when placed in contact with the dye. The first marking composition preferably additionally comprises a pigment, a surfactant and/or a compatibilizer. The second marking composition preferably additionally comprises a compatibilizer and, optionally, a filler. A color change is effected by the marking composition system when the second marking composition is used to apply a mark on top of a mark generated on a given surface by the first marking composition. Alternatively, the first marking composition can be applied on top of a mark generated on a given surface by the second marking composition in order to render the mark generated with the second marking composition visible.

DETAILED DESCRIPTION OF THE INVENTION

The present invention is a marking composition system suitable for use in the form of crayons and pencils and characterized by the special effect of color change. A color change is effected by the marking composition system when the second marking composition is applied on top of a mark generated on a given surface by the first marking composition. In essence, the first marking composition of the color-change marking composition system, when solidified, comprises a dye solubilized in a nonpolar liquid within a wax matrix. The second marking composition of the color-change marking composition comprises an acid dispersed within a wax matrix, when solidified. When the second marking composition is applied on top of the first marking composition, the basic form of the Leuco dye in the first marking composition interacts with the acid in the second marking composition and is converted to its acidic form, thereby effecting a color change. Available in a wide range of color hues, the color changes occur rapidly, i.e., within seconds, and are localized—not being characterized by lateral feathering from the site of application to a given surface over time. Alternatively, the first marking composition can be applied on top of a mark generated on a given surface by the second marking composition in order to render the mark generated with the second marking composition visible.

In addition to color change, the marking composition system is easily manufactured according to current crayon manufacturing technology, demonstrating sufficient shrinkage during solidification to enable easy demolding and maintenance of dispersion of the various components in wax during solidification, and, when formed into a marking instrument, such as a crayon or pencil, is characterized by the capacity to generate a high quality mark, i.e., smooth and even, on a variety of surfaces, good mechanical strength, good appearance, and relatively low hygroscopicity and toxicity.

The marking composition system comprises a first marking composition. The first composition comprises wax, a Leuco dye, which is capable of changing color upon contact with a color change-inducing compound, and a solvent capable of solubilizing the dye. Preferably, the first composition additionally comprises a pigment and/or a compatibilizer.

The wax used in the first marking composition should be one that provides a smooth, uniform and easy laydown when applied to a given surface. It also should be a solid at room temperature, with good mechanical strength. The viscosity of the wax in the molten state should be low enough to facilitate gravity molding of crayons or dipping of pencil leads, although not necessarily low for high viscosity injection or extrusion molded plastic crayons. The wax also should shrink sufficiently upon solidification to facilitate demolding of gravity molded marking instruments, i.e., crayons, and, preferably, is one that is relatively inexpensive. A semi-polar wax optionally can be added to the first marking composition in an amount sufficient to facilitate electron transfer between the basic Leuco dye, present in the first marking composition, and the acid, present in the second marking composition. Preferably, a blend of paraffin, stearamide and stearyl alcohol is used. The paraffin makes the composition harder and less expensive than stearamide/stearyl alcohol blends, alone. Alternatively, microcrystalline wax, such as ShellWax 650® (Shell Oil Co., Houston, Tex.), can be substituted for a portion of the paraffin wax.

Wax should be added to the first marking composition in an amount sufficient to provide the first marking composition with the desired level of strength, hygroscopicity, capacity to suspend added pigments and dyes, without also providing the composition with a viscosity that is too high for processing into a marking instrument. Wax, in particular paraffin wax, such as refined paraffin having a melting point of 142° F., e.g. Parvan 147 (Exxon Co., U.S.A., Houston, Tex.), is advantageously present in an amount up to about 70 wt. %, preferably in an amount of from about 20 wt. % to about 60 wt. %, most preferably in an amount of about 40 wt. %. More than 60% paraffin inhibits the reaction time of the color change, whereas less than 20% paraffin renders the resulting crayon too weak and easily breakable. Stearyl alcohol, such as TA-1618 or TA-1618XP (Procter & Gamble, Cincinnati, Ohio), is advantageously present in an amount from about 20 wt. % to about 50 wt. %, preferably in an amount from about 20 wt. % to about 30 wt. %, most preferably in an amount of about 26 wt. %. Too much stearyl alcohol results in development of the Leuco dye, which affects the color of the resulting crayon, and causes heavy flaking. Too little stearyl alcohol renders the resulting crayon too weak and easily breakable. Stearamide, such as Uniwax 1750 (Unichema Chem., Inc., Chicago, Ill.), is advantageously present in an amount from about 20 wt. % to about 70 wt. %, preferably in an amount from about 20 wt. % to about 30 wt. %, most preferably in an amount of about 26 wt. %. Too much stearamide results in heart flaking, whereas too little causes mold release problems. Microcrystalline wax, such as ShellWax 650® or Multiwax 180M (Witco Colo.), if added to the first marking composition, is present in an amount up to about 15 or 20 wt. %.

The dye used in the first marking composition is an oil-soluble Leuco dye, such as those available from BASF. The Leuco dye is one that can be changed from a basic form to an acidic form upon reaction with an acid and will change color upon reaction with an acid present in the second marking composition. By "change color" is preferably meant a change from one color/hue to another color/hue, although it is also intended to include a change from colored to colorless and a change from colorless to colored. Any Leuco dye can be used in the first marking composition as long as it does not adversely affect the marking characteristics of the composition or adversely interact with any of the other components of the composition.

Examples of Leuco dyes that can be used in the first marking composition include 6-(dimethylamino)-3,3-bis(4-dimethyl-amino)phenyl-(3H)-isobenzofuranone (Copikem I Blue, CVL; Hilton Davis Co., Cincinnati, Ohio), 6'-(diethylamino)-3'-methyl-2' (phenylamino)spiro isobenzofuran-1(3H)-9'-(9H)xanthen)-3-one (Copikem 4 Black, N102; Hilton Davis), 2'-di(phenylmethyl)amino-6'-(diethylamino)spiro(isobenzofuran-1(3H), 9'-(9H)xanthen)-3-one (Copikem 5 Green; Hilton Davis), 3,3-bis(1-butyl-2-methyl-1H-indol-3-yl)-1-(3H)-isobenzofuranone (Copikem 20 Magenta; Hilton Davis), and Copikem 37 Yellow (Hilton Davis).

The minimum concentration of dye that will produce a workable solid marking composition is governed by the color intensity and degree of color change desired. The maximum concentration of dye is determined largely by the ability to maintain a stable composition and the depth of color and degree of color change desired and can vary widely depending upon the concentrations of other components.

A Leuco dye is advantageously added to the first marking composition in an amount sufficient to provide the first marking composition with the desired color and resulting color change, upon contact with the second marking composition, without adversely affecting the marking characteristics, e.g., laydown, of the composition. The Leuco dye is a chromaphore that acts as a Lewis base, developing color in the presence of a Lewis acid, such as a phenolic resin. The dye(s) is advantageously present in an amount from about 0.5 wt. % to about 5 wt. %, preferably in an amount from about 1 wt. % to about 3 wt. %, most preferably in an amount of about 2 wt. %.

Optionally, an oil-soluble dye can be added to the first marking composition. Examples of oil-soluble dyes include Yellow Sudan. The oil-soluble dye can be added in an amount up to about 5 wt. %, preferably in an amount up to about 1 wt. %.

Pigments can be used as colorants in the marking compositions, preferably in the first marking composition and not in the second marking composition, of the present invention. The pigment can be used to enhance or to mask the initial color of the dye. Any organic or inorganic commercial grade pigment can be used, such as green (Binney & Smith No. DC 161144), orange (Binney & Smith No. DC 161136), red (Binney & Smith No. DC 161138), pink (Binney & Smith No. DC 162904) and yellow (Binney & Smith No. DC 161023) available from Magruder et al., and Radiant EP avialable from Radiant Color (Richmond, Calif.). However, too much pigment will mask not only the initial color of the dye but the color change, itself, whereas too little pigment will not be visible.

In general, a workable pigment dispersion may have a wide or narrow particle size range as long as it does not adversely affect the marking characteristics of the composition. Pigments having a mean particle size range from about 0.1 to about 15μ can be used in the marking compositions. Examples of suitable pigment dispersions include Pigment Red 184, Pigment Blue 15-3, and Pigment Black T (Hoescht Celanese Corp.).

The minimum concentration of pigment which will produce a workable color-changing composition is governed by the color intensity desired. The maximum workable concentration of pigment is determined largely by the ability to maintain a stable composition without adversely affecting the marking characteristics of the composition, and can vary widely depending upon the concentration of other components. The pigment is advantageously present in an amount from about 0.5 wt. % to about 10 wt. %, preferably in an amount from about 1 wt. % to about 3 wt. %, most preferably in an amount of about 2 wt. %.

The solvent used in the first marking composition must be one that is capable of solubilizing the dye. Preferably, the solvent is butyl benzyl phthalate, such as Santicizer 160 (Monsanto Chem. Co., St. Louis, Mo.), which also functions as a compatibilizer. The solvent is advantageously present in the first marking composition in an amount from about 1 wt. % to about 10 wt. %, preferably in an amount from about 2 wt. % to about 6 wt. %, most preferably in an amount of about 4 wt. %. Too much solvent weakens the crayon.

A compatibilizer is desirable to assist the compatibilizing of the wax and the solvent. However, it is not critical to the performance of the first marking composition. Dibutyl phthalate is an example of a suitable compatibilizer. If a compatibilizer is added to the first marking composition, it can be present in an amount up to about 6 or 10 wt. %.

The first marking composition can be contacted with any Lewis acid in an amount capable of inducing a color change in the Leuco dye(s) present in the first marking composition. Advantageously, however, a second marking composition is employed in the color-change marking composition system of the present invention. This second marking composition comprises wax and a Lewis acid, which is capable of inducing a color change in a Leuco dye with which it is brought in contact. Preferably, the second marking composition additionally comprises a compatibilizer and/or filler.

The wax used in the second marking composition is one having the same characteristics as the wax used in the first marking composition.

Wax should be added to the second marking composition in an amount sufficient to provide the second marking composition with the desired level of strength, hygroscopicity, capacity to suspend added pigments and dyes, without also providing the composition with a viscosity that is too high for processing into a marking instrument, such as a pencil or crayon. Wax, in particular paraffin wax, is advantageously present in an amount up to about 70 wt. %, preferably in an amount from about 20 wt. % to about 50 wt. %, most preferably in an amount of about 33 wt. %. It is preferred that stearyl alcohol not be added to the second marking composition. It can, however, be added in an amount up to about 35 or 50 wt. %. Stearamide is advantageously present in an amount from about 20 wt. % to about 50 wt. %, preferably in an amount from about 25 wt. % to about 40 wt. %, most preferably in an amount of about 33 wt. %.

The acid used in the second marking composition is a Lewis acid that will change the color of the Leuco dye that is present in the first marking composition. In other words, the Lewis acid, herein referred to as "color change-inducing compound," must be sufficiently acidic to change the dye from its basic form to its acidic form. It also preferably is a nonvolatile active component during crayon manufacture and after application to a given surface. The color change-inducing compound is advantageously a phenolic resin, such as HRJ-13023 or HRJ-1365 (Schenectady Int'l., Inc.). The color-change inducing compound is advantageously present in the second marking composition in an amount from about 10 wt. % to about 50 wt. %, preferably in an amount from about 15 wt. % to about 35 wt. %, most preferably in an amount of about 25 wt. %. Too much phenolic resin renders the resulting crayon toxic, whereas too little phenolic resin does not result in a strong color change.

Dibutyl phthalate can be added to the second marking composition to aid the color change development. If present, it can be added in an amount from about 5 wt. % to about 20 wt. %, preferably in an amount from about 10 wt. % to about 12 wt. %, and most preferably in an amount of about 10 wt. %.

The compatibilizer, though not necessary, assists in compatibilizing the wax and the solvent and aids the color change development. A preferred compatibilizer is butyl benzyl phthalate, such as Santicizer 160 (Monsanto Chem. Co., St. Louis, Mo.). The compatibilizer is advantageously present in the second marking composition in an amount from about 5 wt. % and about 20 wt. %, preferably in an amount from about 10 wt. % to about 12 wt. %, most preferably in an amount of about 10 wt. %., in order to facilitate homogenization. Too little compatibilizer results in a weak color change.

Optionally, the marking compositions can comprise a filler. The filler selected should be inert in regard to the other components of the composition, and is advantageously selected and provided so as to provide the composition with characteristics that are desirable from a processing perspective. The amount of filler added to the second marking composition should not be so great as to adversely affect the other desirable properties of the marking composition, such as smoothness of writing, mechanical strength, and color intensity.

Examples of water-insoluble fillers that are suitable for use include clay, calcium carbonate, talc and mica, with talc being preferred, due to its relatively small particle size and translucence. An example of a preferred talc product is Nytal 400 (R. T. Vanderbilt, Co., Inc., Norwalk, Conn.). If added to the second marking composition, filler can be present in an amount up to about 5 or 20 wt. %.

those of skill in the art, and, accordingly, will not be recited herein.

The following examples are, therefore, illustrative of the present invention and are not intended to be limiting. All percentages are weight percent of the composition, unless specified otherwise.

EXAMPLE 1

This example describes the formation of color-change crayons from the marking compositions.

Crayons comprising the first marking composition were prepared by heating stearyl alcohol, stearamide, paraffin and Santicizer 160 to approximately 240° F. When these ingredients were melted, one or more Leuco dyes were added, while stirring. After the dyes were dissolved (approximately 5 min), dry pigment was added. The mixture was stirred until the pigment was completely dispersed (approximately 3 min). The mixture was then poured onto a crayon mold.

Crayons comprising the second marking composition were prepared by heating paraffin, stearamide, HRJ-1365 wax/resin, and Santicizer 160 to approximately 250° F. The mixture was stirred until the resin was completely dissolved. Then the mixture was poured onto a crayon mold.

EXAMPLES 2-8

These examples describe preferred formulations for the first and second marking compositions.

TABLE I

| INGREDIENTS | SECOND MARKING COMPOSITION | FIRST MARKING COMPOSITION | | | | | |
|---|---|---|---|---|---|---|---|
| | | RED TO BLUE | BLUE TO RED | ORANGE TO BLACK | YELLOW TO GREEN | PINK TO YELLOW | GREEN TO VIOLET |
| Copikem 4 Black | | | | 1.86 | | | |
| Copikem 1 Blue, CVL | | 1.56 | | 0.21 | 0.21 | | 0.34 |
| Copikem 5 Green | | | | | 1.88 | | |
| Copikem 20 Magenta | | | 2.07 | | | | 1.72 |
| Copikem 37 Yellow | | | | | | 1.20 | |
| DC 161144 Green | | | | | | | 2.57 |
| DC 161136 Orange | | | | 2.07 | | | |
| DC 161138 Red | | 2.08 | | | | | |
| DC 162904 TMPink | | | | | | 1.58 | |
| DC 161023 Yellow | | | | | 1.05 | | |
| HRJ-1365 | 24.70 | | | | | | |
| Paraffin | 32.65 | 40.16 | 39.95 | 39.95 | 40.37 | 40.52 | 39.74 |
| Radiant EP | | | 2.07 | | | | |
| Santicizer 160 | 10.00 | 4.00 | 3.98 | 3.98 | 4.02 | 4.04 | 3.96 |
| Stearamide | 32.65 | 26.10 | 25.96 | 25.96 | 26.24 | 26.34 | 25.83 |
| Stearyl Alcohol | | 26.10 | 25.96 | 25.96 | 26.24 | 26.34 | 25.83 |
| TOTAL | 100.00 | 100.00 | 100.00 | 100.00 | 100.00 | 100.00 | 100.00 |

In general, the marking compositions are prepared by dissolving the Leuco dye in a minimum amount of solvent. The components are melted together with mild agitation. If necessary, during the course of production, premature solidification can be prevented during transfer operations by increasing the temperature. The molten system is subsequently formed into the desired marking instrument.

The marking compositions may be formed into any one of a number of marking instruments, such as a crayon or injection molded marking instrument or a pencil, including those ensheathed in wood or encased in plastic, by any suitable means. For example, a crayon can be formed by pouring the molten composition into a cooled steel crayon mold. Methods for accomplishing this are well-known to The above marking compositions were then melted and molded into crayons. The resulting crayons generated high quality marks on a variety of surfaces, low hygroscopicity, high viscosity, low toxicity, and uniform laydown. The resulting crayons also produced color changes within seconds of application of the second marking composition on top of a mark generated with the first marking composition.

All of the references cited herein, including patents, patent applications and journal articles, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A color-changing marking composition system comprising:

(a) a first marking composition comprising a wax, a Leuco dye which changes color when contacted with a color change-inducing compound, and a solvent capable of solubilizing the dye; and (b) a second marking composition comprising a wax and a color change-inducing compound which induces a color change in the dye when contacted with the dye.

2. The color-changing marking composition system of claim 1, wherein said Leuco dye in said first marking composition is selected from the group consisting of 6-(dimethylamino)-3,3-bis(4-dimethyl-amino)phenyl-( 3H)-isobenzofuranone, 6'-(diethylamino)-3'-methyl-2'(phenylamino)spiro isobenzofuran-1(3H)-9'-(9H)xanthen)-3-one, 2'-di(phenylmethyl)amino-6'-(diethylamino)spiro(isobenzofuran-1(3H), 9'-(9H)xanthen)-3-one, and 3,3-bis(1-butyl-2-methyl-1H-indol-3-yl)-1-3H)-isobenzofuranone.

3. The color-changing marking composition system of claim 1, wherein said Leuco dye in said first marking composition is present in an amount from about 0.5 wt. % to about 5 wt. %.

4. The color-changing marking composition system of claim 3, wherein said Leuco dye in said first marking composition is present in an amount from about 1 wt. % to about 3 wt. %.

5. The color-changing marking composition system of claim 1, wherein said color change-inducing compound is a Lewis acid.

6. The color-changing marking composition system of claim 5, wherein said Lewis acid is a phenolic resin.

7. The color-changing marking composition system of claim 1, wherein said color change-inducing compound is present in an amount from about 10 wt. % to about 50 wt. %.

8. The color-changing marking composition system of claim 7, wherein said color change-inducing compound is present in an amount from about 15 wt. % to about 35 wt. %.

9. The color-changing marking composition system of claim 1, wherein said wax in said first and second marking compositions is selected from the group consisting of paraffin, stearyl alcohol, stearamide, and mixtures thereof.

10. The color-changing marking composition system of claim 9, wherein, in the first marking composition, paraffin is present in an amount up to about 70 wt. %, stearyl alcohol is present in an amount from about 20 wt. % to about 50 wt. %, and stearamide is present in an amount from about 20 wt. % to about 70 wt. %; and in the second marking composition, paraffin is present in an amount up to about 70 wt. % and stearamide is present in an amount from about 20 wt. % to about 50 wt. %.

11. The color-changing marking composition system of claim 10, wherein, in the first marking composition, paraffin is present in an amount from about 20 wt. % to about 60 wt. %, stearyl alcohol is present in an amount from about 20 wt. % to about 30 wt. %, and stearamide is present in an amount from about 20 wt. % to about 30 wt. %; and in the second marking composition, paraffin is present in an amount from about 20 wt. % to about 50 wt. %. and stearamide is present in an amount from about 25 wt. % to about 40 wt. %.

12. The color-changing marking composition system of claim 1, wherein said second marking composition additionally comprises a compatibilizer.

13. The color-changing marking composition system of claim 12, wherein said solvent in said first marking composition and said compatibilizer in said second marking composition is butyl benzyl phthalate.

14. The color-changing marking composition system of claim 12, wherein, in said first marking composition, said solvent is present in an amount from about 1 wt. % to about 10 wt. %; and in said second marking composition, said compatibilizer is present in an amount from about 5 wt. % to about 20 wt. %.

15. The color-changing marking composition system of claim 14, wherein, in said first marking composition, said solvent is present in an amount from about 2 wt. % to about 6 wt. %; and in said second marking composition, said compatibilizer is present in an amount from about 10 wt. % to about 12 wt. %.

16. The color-changing marking composition system of claim 1, wherein said first marking composition additionally comprises a pigment.

17. The color-changing marking composition system of claim 16, wherein said pigment is present in an amount from about 0.5 wt. % to about 10 wt. %.

18. The color-changing marking composition system of claim 17, wherein said pigment is present in an amount from about 1 wt. % to about 3 wt. %.

19. The color-changing marking composition system of claim 1, wherein said first marking composition comprises from about 20 wt. % to about 60 wt. % paraffin, from about 20 wt. % to about 30 wt. % stearyl alcohol, from about 20 wt. % to about 30 wt. % stearamide, from about 1 wt. % to about 3 wt. % Leuco dye, from about 1 wt. % to about 3 wt. % pigment, and from about 2 wt. % to about 6 wt. % butyl benzyl phthalate, and said second marking composition comprises from about 20 wt. % to about 50 wt. % paraffin, from about 25 wt. % to about 40 wt. % stearamide, from about 15 wt. % to about 35 wt. % phenolic resin, and from about 10 wt. % to about 12 wt. % butyl benzyl phthalate.

20. The color-changing marking composition system of claim 1, wherein said first marking composition comprises about 40 wt. % paraffin, about 26 wt. % stearyl alcohol, about 26 wt. % stearamide, about 2 wt. % Leuco dye, about 2 wt. % pigment, and about 4 wt. % butyl benzyl phthalate, and said second marking composition comprises about 33 wt. % paraffin, about 33 wt. % stearamide, about 25 wt. % phenolic resin, and about 10 wt. % butyl benzyl phthalate.

* * * * *

UNITED STATES PATENT AND TRADEMARK OFFICE
CERTIFICATE OF CORRECTION

PATENT NO. : 5,460,647
DATED : October 24, 1995
INVENTOR(S) : Colin M. Snedeker, et. al.

It is certified that error appears in the above-indentified patent and that said Letters Patent is hereby corrected as shown below:

Title page, item [56], col. 2,

References cited:

The following references should be added to the list of U.S. Patent Documents:

| | | |
|---|---|---|
| 5,082,386 | 1/1992 | Hironaka et al. |
| 5,106,881 | 4/1992 | Inoue et al. |
| 5,118,350 | 6/1992 | Prasad |
| 5,120,359 | 6/1992 | Uzukawa et al. |
| 5,139,572 | 8/1992 | Kawashima |
| 5,176,746 | 1/1993 | Nakanishi et al. |
| 5,196,237 | 3/1993 | May |
| 5,196,243 | 3/1993 | Kawashima |
| 5,203,913 | 4/1993 | Yamamoto et al. |
| 5,215,956 | 6/1993 | Kawashima |
| 5,222,823 | 6/1993 | Conforti |
| 5,232,494 | 8/1993 | Miller |
| 5,262,535 | 11/1993 | Kaiser |
| 5,279,859 | 1/1994 | May |
| 5,302,194 | 4/1994 | Tanabe et al. |
| 5,324,348 | 6/1994 | Perret, Jr. |

UNITED STATES PATENT AND TRADEMARK OFFICE
CERTIFICATE OF CORRECTION

PATENT NO. : 5,460,647
DATED : October 24, 1995
INVENTOR(S) : Colin M. Snedeker, et. al.

It is certified that error appears in the above-indentified patent and that said Letters Patent is hereby corrected as shown below:

Column 4, line 44, "heart" should read --heavy--.

Signed and Sealed this

Fourth Day of June, 1996

*Attest:*

BRUCE LEHMAN

*Attesting Officer*  Commissioner of Patents and Trademarks